(12) United States Patent
Geiger et al.

(10) Patent No.: US 12,567,048 B2
(45) Date of Patent: Mar. 3, 2026

(54) HARDWARE SYSTEM FOR IDENTIFYING GRAB- AND-GO TRANSACTIONS IN A CASHIERLESS STORE

(71) Applicant: Kooick Inc., New York, NY (US)

(72) Inventors: Davi Geiger, Old Greenwich, CT (US); Carlos Henrique Cavalcanti Corrêa, Rio de Janeiro (BR)

(73) Assignee: Kooick Inc., New York, NY (US)

( * ) Notice: Subject to any disclaimer, the term of this patent is extended or adjusted under 35 U.S.C. 154(b) by 0 days.

(21) Appl. No.: 17/477,723

(22) Filed: Sep. 17, 2021

(65) Prior Publication Data

US 2022/0084005 A1 Mar. 17, 2022

Related U.S. Application Data

(60) Provisional application No. 63/079,623, filed on Sep. 17, 2020.

(51) Int. Cl.
*G06Q 20/20* (2012.01)
*G06V 20/13* (2022.01)

(52) U.S. Cl.
CPC ......... *G06Q 20/203* (2013.01); *G06Q 20/202* (2013.01); *G06Q 20/206* (2013.01); *G06V 20/13* (2022.01); *G06F 2218/16* (2023.01)

(58) Field of Classification Search
CPC .. G06Q 20/203; G06Q 20/202; G06Q 20/206; G06V 20/13; G06V 20/52;

(Continued)

(56) References Cited

U.S. PATENT DOCUMENTS 9,330,474 B1 * 5/2016 Shekar .................. G06V 20/52
9,996,818 B1 * 6/2018 Ren .................... G06F 16/5866
(Continued)

FOREIGN PATENT DOCUMENTS

WO WO-2021150406 A1 * 7/2021 .......... F25D 29/003

OTHER PUBLICATIONS

Milella, Annalisa, Towards Intelligent Retail: Automated On-Shelf Availability Estimation Using a Depth Camera, 2021 23rd International Conference on Control Systems and Computer Science, pp. 243-248. (Year: 2020).*

(Continued)

*Primary Examiner* — Aaron N Tutor
(74) *Attorney, Agent, or Firm* — Meister Seelig & Fein PLLC

(57) ABSTRACT

A method and system for detecting a commercial transaction through physical interactions with products, the system comprising a frame that is placed within a product display unit. The frame includes a shelf, at least one camera, a weight sensor, and display screens. The system further comprises a computing device communicatively connected to the frame. The computing device is configured to detect physical interactions with items that are placed on the shelf based on data that is received from the at least one camera and the weight sensor. The computing device is further configured to determine a commercial transaction associated with physical interactions and transmit item and price data to the display screens based on machine learning of the physical interactions with items.

20 Claims, 4 Drawing Sheets

(58) Field of Classification Search
CPC ...... G06F 2218/16; G07F 9/002; G07F 9/023;
G07F 9/026; G07F 17/0092
See application file for complete search history.

(56) References Cited

U.S. PATENT DOCUMENTS

| | | | | |
|---|---|---|---|---|
| 10,064,502 B1 | 9/2018 | Gyori | | |
| 10,121,121 B1 | 11/2018 | De Bonet | | |
| 10,140,820 B1 | 11/2018 | Zalewski | | |
| 11,636,740 B2 | 4/2023 | Zalewski | | |
| 11,741,447 B1 | 8/2023 | Matheson | | |
| 11,879,213 B2 | 1/2024 | Pereira Maia | | |
| 11,893,534 B2 | 2/2024 | Hines | | |
| 2012/0004769 A1* | 1/2012 | Hallenbeck | G07F 11/62 | |
| | | | 700/232 | |
| 2013/0039543 A1 | 2/2013 | Fuhr | | |
| 2014/0039951 A1 | 2/2014 | Appel | | |
| 2015/0019391 A1 | 1/2015 | Kumar | | |
| 2016/0364686 A1* | 12/2016 | Wolfe | G06K 7/10861 | |
| 2017/0228686 A1 | 8/2017 | Bermudez Rodriguez | | |
| 2019/0088096 A1 | 3/2019 | King | | |
| 2020/0118400 A1 | 4/2020 | Zalewski | | |
| 2020/0184230 A1 | 6/2020 | Liu | | |
| 2020/0184442 A1 | 6/2020 | Gu | | |
| 2020/0184444 A1 | 6/2020 | Gu | | |
| 2020/0184447 A1 | 6/2020 | Gu | | |
| 2021/0342805 A1 | 11/2021 | Geiger | | |
| 2021/0406813 A1* | 12/2021 | Liu | G06Q 10/087 | |
| 2022/0067689 A1* | 3/2022 | Guack | G06V 10/82 | |

OTHER PUBLICATIONS

R.S.C. Broadband Supply Co., Lenses for Video Motion Detection, 2006 (Year: 2006).*
CCTVCAD Software, CCTV Design Lens Calculator (Year: 2019).*
Annalisa Milella, Towards Intelligent Retail: Automated On-Shelf Availability Estimation Using a Depth Camera, Jan. 30, 2020, IEEEAccess, Institute of Intelligent Industrial Systems and Technologies for Advanced Manufacturing, National Research Council of italy, vol. 8, pp. 19353-19363 (Year: 2020).*
PCT International Search Report and Written Opinion for International Application No. PCT/US2021/036300, Sep. 21, 2021 (11 pages).
Douglas et al. "Amazon Go, the cashierless retail store of the future, has some new competition." Nov. 12, 2019 (Nov. 12, 2019) Retrieved on Aug. 10, 2021 (Aug. 10, 2021) from <https://www.cnbc.com/2019/11/12/amazon-go-cashierless-store-of-the-future-has-some-new-competition.html> entire document.
Ives et al. "Amazon Go: Disrupting retail?" Journal of Information Technology Teaching Cases 9.1 (2019): 2-12. Mar. 26, 2019 (Mar. 26, 2019) Retrieved on Aug. 10, 2021 (Aug. 10, 2021) from <https://journals.sagepub.com/doi/full/10.1177/2043886918819092> entire document.
Schmidt et al. "Ubiquitous interaction-using surfaces in everyday environments as pointing devices." ERCIM Workshop on User Interfaces for All. Springer, Berlin, Heidelberg, 2002. Mar. 14, 2003 (Mar. 14, 2003) Retrieved on Aug. 10, 2021 (Aug. 10, 2021) from <https://link.springer.com/chapter/10.1007/3-540-36572-9_21 > entire document.
EPO Search Report for Application No. 21796707.4, Oct. 5, 2023 (9 pages).

* cited by examiner

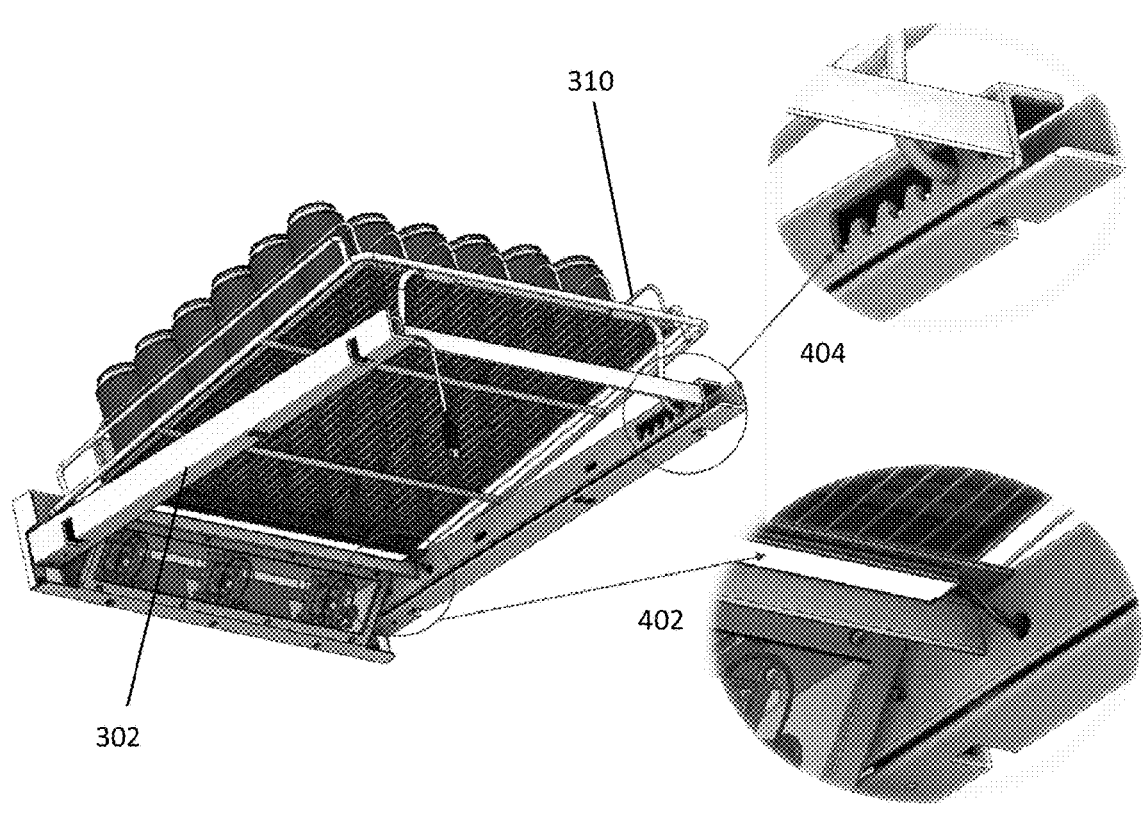
Fig. 4
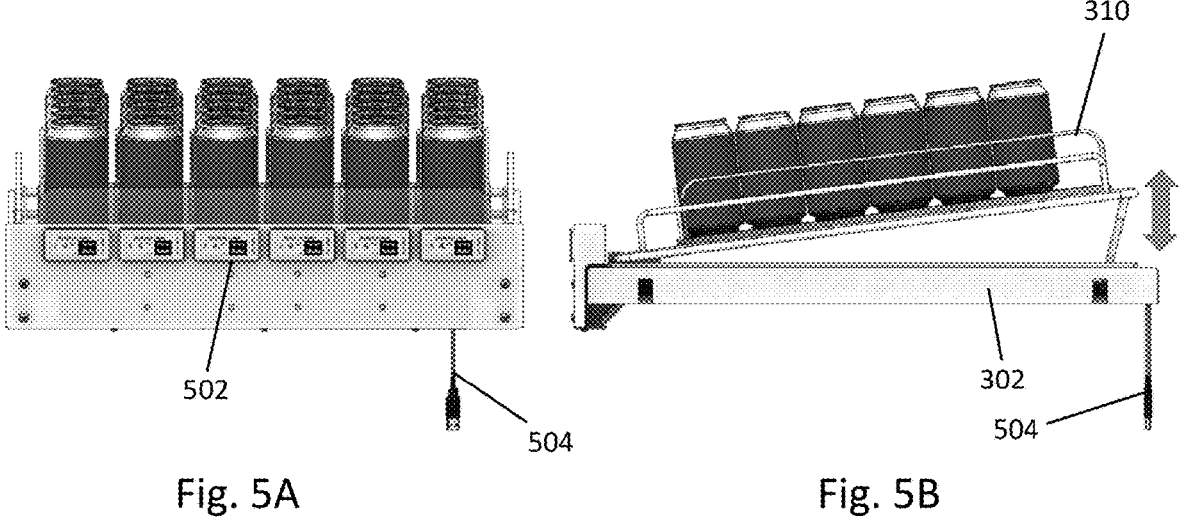
Fig. 5A                    Fig. 5B

HARDWARE SYSTEM FOR IDENTIFYING GRAB- AND-GO TRANSACTIONS IN A CASHIERLESS STORE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATION

This application claims the priority of U.S. Provisional Application No. 63/079,623, entitled "HARDWARE SYSTEM FOR IDENTIFYING GRAB-AND-GO TRANSACTIONS IN A CASHIERLESS STORE," filed on Sep. 17, 2020, the disclosure of which is hereby incorporated by reference in its entirety.

BACKGROUND OF THE INVENTION

Field of the Invention

This application generally relates to cashierless transactions, and in particular, tracking physical activities and states of items or shelves in a commercial environment to manage inventory while also allowing for studying human behavior during interactions with the shelves.

Description of the Related Art

The existence of commercial refrigerators and cabinets is abundant; millions of them exist in different formats and at different types of commercial places. For example, it is common to find in pharmacies closed cabinets with razors, electric tooth brushes, and other products. Also in pharmacies, one may find refrigerators with beverages. Typically today, users may take items from such refrigerators and/or cabinets and pay for these items at a cashier. Moreover, these items are filled or replenished by someone representing the vendor and an accurate account of the replenishment/stock is a requirement by the vendor.

SUMMARY OF THE INVENTION

The present invention provides a method and system for detecting a commercial transaction through physical interactions with products. According to one embodiment, the system comprises a frame that is placed within a product display unit. The frame includes a shelf, at least one camera, a weight sensor, and display screens. The system further comprises a computing device communicatively connected to the frame. The computing device is configured to detect physical interactions with items that are placed on the shelf based on data that is received from the at least one camera and the weight sensor. The computing device is further configured to determine a commercial transaction associated with physical interactions and transmit item and price data to the display screens based on machine learning of the physical interactions with items.

The frame may include at least one front camera and/or at least one rear camera. The frame may also include at least a motor that is configured to move the at least one camera along a width of the shelf. The display screens may simulate price tags for the items. The computing device may be further configured to interact with consumers via a real time voice recognition system. The at least one camera may be configured to cover a view of an entire shelf full, or partially full, of items below it.

At least one camera may be configured at a height h above the shelf, having an angle view $\Phi$, and configured according to an angle $\theta$ for covering a depth D of items of height up to A to be seen. The angle $\theta$ includes an angle the at least one camera makes with the shelf to cover a first item at a distance d. In one embodiment, $$\theta = \frac{\pi}{2} - \frac{\Phi}{2} - \tan^{-1}\frac{d}{h}.$$

In another embodiment, depth $$D = \frac{h - A}{\tan\left(\frac{\pi}{2}\Phi - \tan^{-1}\frac{d}{h}\right)},$$

the maximum depth that the at least one camera can cover.

The shelf may include a mechanism to adjust angle and direction of the at least one camera. The system may further comprise a jig including a plurality of mechanisms including a plurality of cameras, wherein the plurality of mechanisms are configured to simultaneously adjust angle and direction of the plurality of cameras. The jig may further comprise a motor mechanism configured to move the at least one camera along a width of the shelf. The system may further comprise video cameras coupled to the computing device, wherein the video cameras are configured to monitor activities outside of the shelf to check products leaving and returning to the shelf.

The display screens may include information indicating item availability and item characteristics, wherein the information is programmable via the computing device. The computing device may be further configured to transmit promotions from a list of predefined promotions to the display screens. The computing device may also be configured to transmit dynamic pricing to the display screens. The computing device can be configured to transmit price updates and promotions to the display screens based on machine learning of objectives set by a vendor.

The system may further comprise a hub executing a power up sequence of the shelf and transmitting a command the shelf to power up the at least camera. The system may also further comprise a tiered USB hub and controller configuration.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 4 illustrates load cells placed on a shelf frame according to an embodiment of the present invention.

FIGS. 5A and 5B illustrate a shelf unit according to an embodiment of the present invention.

DETAILED DESCRIPTION OF THE INVENTION

Figure 1:
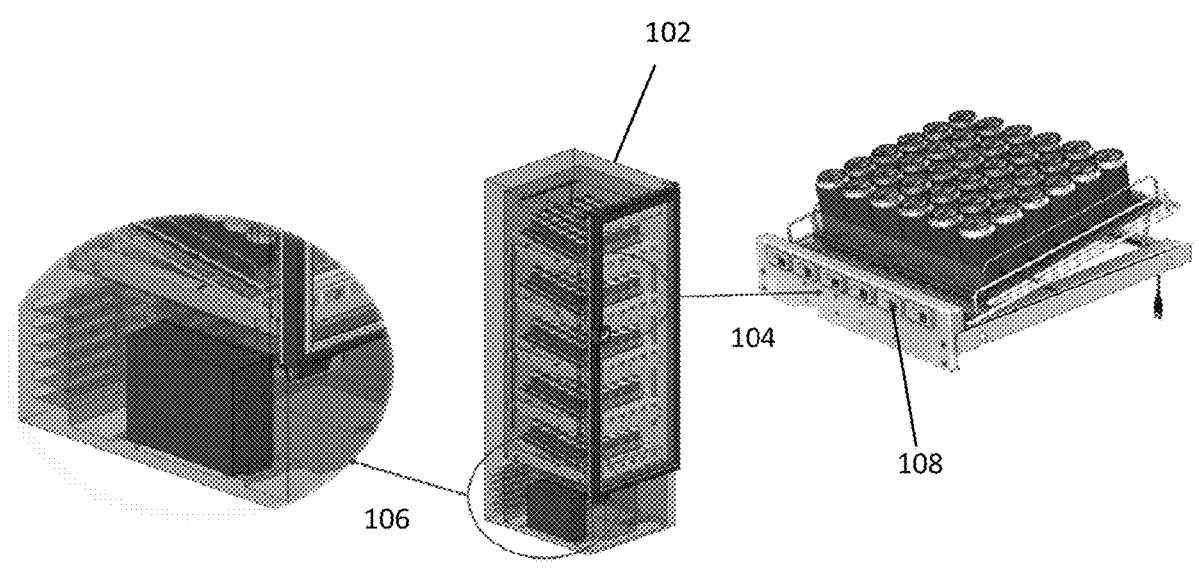
FIG. 1 illustrates shelf and computing hardware according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a shelf hardware and firmware system equipped with cameras and weight sensors to replace conventional shelves used in pods, where a pod can be a refrigerator or a cabinet. The shelf may communicate with a computer placed nearby (or inside) the pod. Such shelves will provide data for artificial intelligence ("AI") systems to detect a commercial transaction through physical interactions with product items available and displayed at these shelves. The shelves may also provide support for the AI system to automatically identify the replenishment of a pod (e.g., a cooler or a cabinet), by providing the data needed to identify which items were replenished and reporting to the vendor (e.g., managing the pod). Thus, the shelf hardware with the use of AI software effectively provides an automatic pod management system.

The disclosed system may also include a platform that provides analysis of human behavior while using the pod, by providing all the data for recognizing physical interactions of the consumer with the products inside the pod. This includes providing the data to identify that an item was taken and placed back (possibly elsewhere) in the pod. As such, the shelf hardware not only provide the data for the final transactions (for which a commercial receipt is prepared), but also for all transactions during a session. All of these functionalities can run locally on the pod computer as a consequence of the shelf hardware providing data communication from the shelves to the computer at the pod. For the local processing to be sufficient, the pod computer includes processing capability to run AI software. Alternatively, the computer at the pod may preprocess or filter the data reducing the amount of data, to transmit to cloud computing infrastructure where AI applications are hosted.

The local computer can infer which shelf was manipulated by the consumer and send the data associated to such shelf. The local computer can restrict the video camera frames to where items are present in the hand of the consumer. Other local computations can occur. These different possibilities correspond to different embodiments of the invention.

A shelf can also provide data communication between the pod and the human (consumer) that maybe interested in the products provided by the pod. A shelf may include display screens (such as liquid crystal display ("LCD")) to indicate the items and price, and the information can be dynamically updated. This mechanism of dynamic pricing and screen display may be used by a software system that learns consumer behavior and as a consequence, return marketing strategies of prices and items for promotion inside the pod. Another mechanism of communication for a shelf may be via voice with the user of the pod. Voice recognition capability is useful for the visually impaired customers and to many activities for everyone.

The presently disclosed system provides all the hardware compactly placed in the shelves, with a printed circuit board jig supporting the electronics of cameras and load cells, boxes to place cameras in stable positions and adjustment for the angles of view of the cameras, and provides mechanisms for inclining the shelves so gravity can bring all items towards the front without affecting the sensors. Despite having weight sensors placed on them, shelves may also be configured for large height differences between two consecutive shelves. The disclosed shelf system provides the flexibility needed to build different size coolers and cabinets for different types of items, while simplifying the need for cables. A cable for each shelf may connect to a central hub or computing device that interfaces with a main computer placed nearby or inside the pod.

A computer 106 may be placed outside the internal space of a pod 102 where consumers shop and yet close to shelves unit 104 within the pod so that the shelves unit 104 can communicate data securely to the computer 106 and receive power from the computer 106, as illustrated in FIG. 1. A pod 102 may comprise any product display unit or storage, such as a refrigerator, cooler, cabinet, etc. According to the illustrated embodiment, the computer 106 is placed inside the bottom of the pod. In this way it is well protected by the pod 102. While one could use wireless cameras in the shelves unit 104 powered by batteries, this can cause communications to be exposed to any nearby electronic device to interfere with it and batteries have finite time of usage. Thus, cables are utilized to secure communications and provide power, eliminating the need to replace batteries every so often.

Each shelf unit 104 may have a printed circuit where all sensors communicate data and, for example, one cable going through the frame of the shelf unit 104 providing power and transmitting/receiving data to/from the shelf unit 104. A cable for each shelf may connect the printed circuit device to a central hub or computing device (in one embodiment of the invention the server or computing device uses USB) that interfaces with computer 106 placed nearby or inside the pod 102. The central hub may assign an identifier to each shelf in a pod, for identification during sessions of the use of the pod 102. Shelves unit 104 may also include screen display 108 for dynamic price updates in front of each lane.

Figure 2:
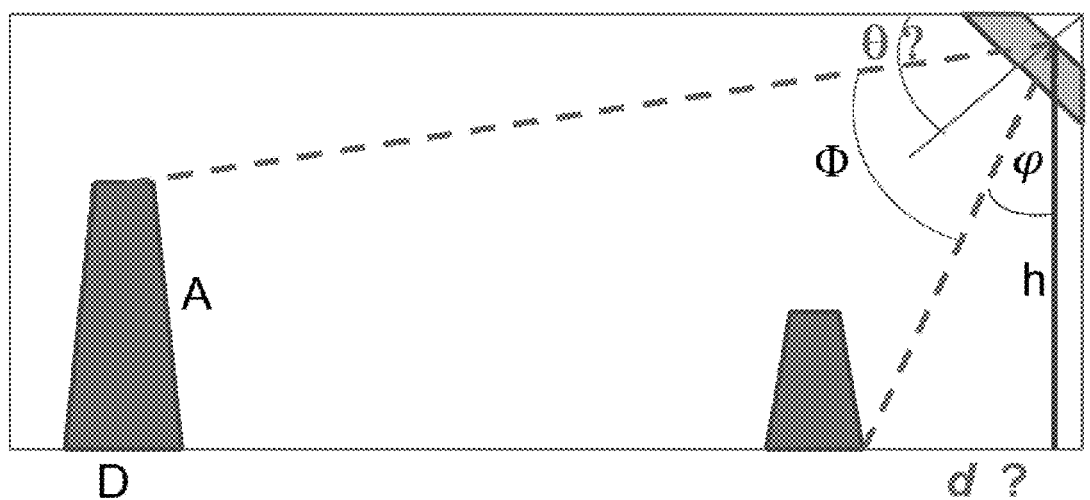
FIG. 2 illustrates a side view of a shelf as viewed by a camera according to an embodiment of the present invention.

Angle and Depth Covering: The disclosed system may provide support for cameras to be placed such that they may cover the view of an entire shelf full, or partially full, of items below it. FIG. 2 presents a side view of a shelf and the variables h, d, D, A, Φ, θ, φ. The illustration may be used to help find the geometry and trigonometry to estimate an angle θ that a camera with angle view Φ should be placed and a depth D it can cover for items of height up to A to be seen. Here π/2=Φ+θ+φ.

A pod with a significant higher depth may require cameras to be placed on the back of a shelf to visually cover an entire shelf. A formula may be used to estimate an angle for placing a front camera, and FIG. 2 illustrates the scenario where the following variables are given (i) h—height between the camera and the shelf below (ii) d—the distance of the closest item to the shelf-front: this value can be slightly larger as it may not be required of the camera to see the bottom of the first item, and instead, just enough of the item to classify it correctly; (ii) D—depth or distance of the furthest item to be considered from the shelf-front cameras; (iii) A—height of the tallest item to be considered among a list of items to be placed in the pod; (iv)Φ—field of view of the camera along the pitch angle. The variable θ, the angle the camera should make with the shelf to cover for the first item at distance d is desired. A depth D that camera angle θ will cover given tallest item A can be present in the shelf is also desired.

Referring to FIG. 2, a formula is derived as follows $$d = h\tan\varphi = h\tan\left(\frac{\pi}{2} - \theta - \frac{\Phi}{2}\right)$$

and thus, $$\theta = \frac{\pi}{2} - \frac{\Phi}{2} - \tan^{-1}\frac{d}{h}. \quad (1)$$

Then, using that $$\frac{h-A}{D} = \tan\left(\theta - \frac{\Phi}{2}\right)$$

and formula (1) results in $$D = \frac{h-A}{\tan\left(\frac{\pi}{2} - \Phi - \tan^{-1}\frac{d}{h}\right)}, \quad (2)$$

which is the maximum depth that such camera can cover and see every item in it (up to one item occluding another one).

With these two formulas, one can define the best angle θ to adjust the front camera and cover a depth D in a cooler for items as tall as height A, with shelves of height h, and cameras covering pitch wide angle Φ. If there is a need to cover a depth further than D, additional back cameras can be placed on the shelf and using the same formula, starting from the back of the shelf looking towards the front of the shelf, an adjustment can be made to the camera angle to cover up to a depth Db, indicating depth from the back to front. Note the parameter d can be different for the front camera and back camera, resulting on a value Db different than D. Thus, with cameras in the front and in the back, a depth D+Db is covered which is larger than Dpod (the depth of the pod) to visually cover a pod.

Camera Angles Mechanisms: The height h between two shelves may be configured by the vendor and vary according to the items being sold (on the shelves) and size of the pod. Taller objects may require larger height between shelves. The shelf height h, depth of the pod Dpod, objects sizes A, and choice of wide angle lenses Φ may have an impact on the best angle a camera should be placed on the shelf, as derived above in formula (1) and (2). A vendor may prefer to have as many items as possible to be offered to consumers, because replenishing the items require logistics and human work (to bring new items to the pod) which then translates in costs that should be minimized by vendors. Accordingly, a shelf may include a mechanism to adjust the camera angle and direction (e.g., yaw and pitch) to best fit the setting of the pod (a cooler or a cabinet), items dimensions, and camera angle.

Figure 3A:
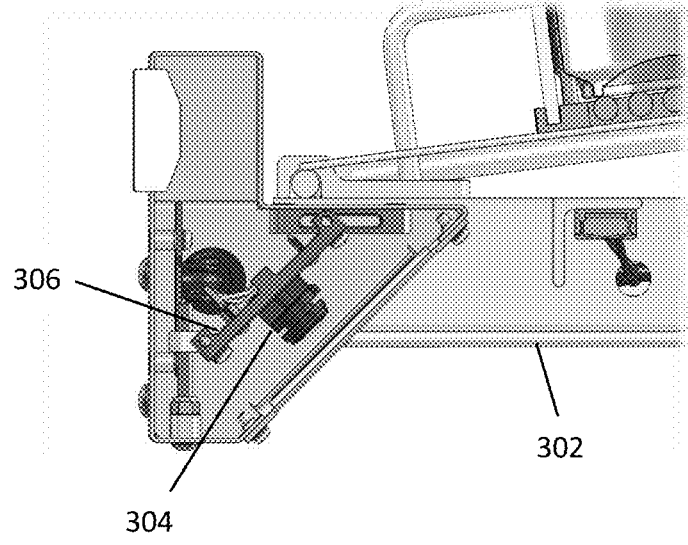
FIG. 3A illustrates a side view of a shelf including a box and mechanism that adjusts a camera according to an embodiment of the invention.

FIG. 3A presents a side view of a shelf frame 302 including a box 306 containing a mechanism that adjusts a camera 304 according to an embodiment of the invention. In a very common scenario, there may be a need to guarantee that all cameras are turned by the same angle and for such calibration to be as simple as possible. In this case, the presently disclosed system may adjust the angles of the entire set of cameras together. For example, a single knob may move boxes holding the camera at once.

Figure 3B:
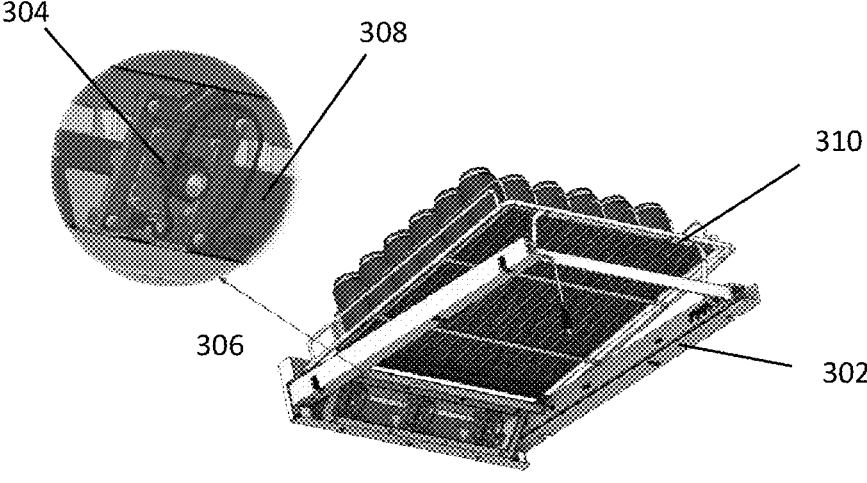
FIG. 3B illustrates a shelf including three frontal cameras covering six lanes according to an embodiment of the invention.

Referring to FIG. 3B, a jig may be configured to hold a plurality of box 306 on a given shelf. Each of a plurality of boxes 306 may be configured to hold a camera 304 which is connected to a printed circuit 308. The jig may simultaneously hold multiple ones of box 306 with camera 304 on the shelf 310 such that multiple ones of camera 304 can be adjusted (e.g., angle and direction) or rotated at once. Accordingly, shelves may also include boxes to place cameras looking at the shelf below at different yaw and pitch angles. These boxes may be made so that cameras are protected from user manipulation at the shelves.

Moreover, filters made with anti-fog films may be mounted on each camera and protect the cameras from fog that can occur. At the level of the software, fog can also be detected but may cause delays in the usability of the camera while filters with anti-fog films can eliminate or reduce the time where fog is present. Mechanisms to adjust the yaw and pitch angles of the cameras at each box can also be constructed on some scenarios. There are scenarios that such boxes can be displaced along the shelves so that the distance between cameras can be reduced or increased. The simpler is the hardware for an application the more cost effective is the hardware solution. So these scenarios above are considered according to the ultimate needs of the vendor.

Width and Cameras Spatial Distribution: Coverage of a shelf along the depth of a pod is discussed above, but coverage of the shelf along the width of the pod may also be needed. If items are placed along lanes that go from front to the back (along depth), there may be occlusion-width effects where a camera view of items along a further away (width wise) lane are obstructed by items along a nearby lane. There may also be occlusion-depth effects where items in a lane obstruct items behind them, on the same lane. For an occlusion effect to take place, it is necessary or sufficient for an occluded item to be along the ray between the camera and an occluder item. Of course, the taller the occluder item is and the shorter the occluded item is, the more the occlusion effect and the less of the occluded item will be visible to the camera.

In one embodiment, cameras can be placed between two lanes to minimize the occlusion-depth effect along such two lanes. In this embodiment, the pod includes six (6) lanes and thus three cameras along the width of the shelf 310 as seen in FIG. 3B. The wider a shelf is, the more lanes it may have. A camera may be placed between two lanes, and thus 2N lanes may be covered with N cameras. Moreover, shelves can be inclined (discussed in further detail below) and then, items on the back appear to be taller and thus the depth-occlusion effect is reduced. If the height between the shelves is allowed by vendor to be increased, cameras can be placed further inside the pod to cover for wider views with less occlusion effects. With a fish eye camera and proper height, an entire shelf can be covered by one camera placed in the center of the shelf. However, the items will be seen mostly from the top and thus, visual differentiation should exist. If all items are cans with the same metal cover, visual differentiation may not be possible without making items that are visually differentiated from the top.

In one embodiment where cameras are placed in front to visually distinguish the items, the challenge is that occlusions will demand more cameras. The number of cameras is then dependent on the AI system and items being sold. If one is selling just one item, a weight sensor system may be sufficient to output accurate reports and the shelf may not need a camera. If items vary in height, shape, and occlusions are significant, one may require one camera per two lanes. If items of similar heights differ on visual details that are easily occluded, it may be beneficial to have cameras per two lanes. Various ones of these arrangements can be incorporated into the disclosed shelf system.

Motor Mechanism: A shelf can also incorporate a motor mechanism attached to a jig to move a camera 304 (box 306), such as a conveyer belt. In this way, a camera 304 can move along, for example, the width of the shelf 310, and then several photos can be taken of the shelf 310. Such a motor mechanism may help cover an entire shelf and better resolve occlusions scenarios. Even depth from motion can be obtained with such a mechanism for each item at the shelf 310. The challenge of using a motor mechanism (motors) is that it takes a longer time to cover an entire shelf, and one introduces another mechanical mechanism prone to failures, the one used to move the camera around the shelf. However, a main advantage of a motor mechanism is needing just one camera to cover the same area while being able to take more photos within a given width compared to just one per two lanes as suggested for the static case. More photos may help better resolve occlusions scenarios.

Weight Sensors: Referring to FIG. 4, the shelf system may include weight sensors 402 (load cells) distributed so that it converts the shelf 310 into a scale of when items are taken or put back to the shelf 310. In some scenarios shelves can also provide position of where the weight has changed, i.e., when an item is added or removed from the shelf 310, the weight sensors 402 may not only provide the weight change but also information to locate where the change occurred at the time of the change. Further description and details of formulae of how to compute location associated with a weight change may be found in "Ubiquitous Interaction—Using Surfaces in Everyday Environment as Pointing Devices", A. Schmidt et. al., Conference Paper in Lecture Notes in Computer Science, October 2002, DOI: 10.1007/3-540-36572-9_21 which is hereby incorporated by reference in its entirety. Fewer load cells, at least two, can be used as well. The weight sensor 402 will also receive power and transmit data through the same cable that a shelf has, as illustrated in FIG. 4. The printed circuit can also communicate data with the load cells.

Height between Shelves: Weight sensors 402 (load cells) can add thickness to the shelves. According to one embodiment, the weight sensors 402 can be placed around the frame 302 of the shelves, as shown by FIG. 4 which illustrates where they can be placed. While the frame may have a thickness imposed by the load cells, the entire surface area of the shelf 310 where the items are placed does not have to be thick, as illustrated in FIG. 4. This design allows for maximum height between the shelf surfaces, in the sense that the thickness due to the weight sensors does not impact the height between the shelf surfaces. As formula (2) above indicates, the larger value of the height h yields further depth D that cameras can see.

Inclining Shelves for Gravity: The mechanical design of the disclosed shelf hardware allows for the shelf surface to be placed at different angles as shown in FIGS. 4, 5A and 5B. The surface area can be inclined as shown in the figure, and the levels can be manually chosen (404). The power for the load cells and data transmission may be through a cable per shelf. Inclining a shelf so that gravity can cause items to move towards the front of the shelf may be a mechanism used as consumers shop and withdraw items often from the front of the shelves, thus requiring a mechanism to bring items from the back of the shelf towards the front.

Previous mechanisms were either plastic materials placed on top of the shelves to create the height gradient or shelves were hard screwed into the cabinet at such inclinations, thus no flexibility of changing it. Different items of different weights and heights and widths are impacted by the gravity differently and avoiding them to fall is a concern with gravity made shelves. According to at least one embodiment, the disclosed shelves may allow vendors to mechanically and easily at any time, adjust the inclination that best adjust to the items they are selling at any time. There are levels of inclination (404) that are stable and can be manually changed, as shown in FIG. 4. The shelves may be inclined such that the weight sensors remains calibrated. This may be accomplished by placing the load cells on the frame of the shelf, which is not inclined with the shelf surface.

Other sensors can be attached to the disclosed shelves 310. A very common sensor that may be needed for the application of the shelves is a thermometer, which can be added. Another sensor may include video cameras. Video cameras may be used to monitor activities just outside the shelves, checking which products leave the shelves and return to the shelves. One may place one or two cameras per shelf, on the sides of the shelf pointing towards each other and "securing" what comes in and out of the shelves. These video shelves may also be communicated with the pod computer 106. The challenge is that processing video data can be very intensive in memory, storage, and processing. In order to minimize the use of video cameras one may consider placing only such video camera, with wide angle views, on the sides of the top shelves looking down to secure all shelves. In most scenarios, but not all, these two cameras can secure a pod. Other sensors not discussed herein may also be considered.

Dynamic Price Updates: Shelves may be configured with a display system 502 that provides information corresponding to items on the shelf. Such display system 502 may be made with multiple display screens that simulate price tags in a usual vending machine. For example, the display system 502 may include LCD screens that indicate which items are available, characteristics of such items, and prices for them. These displays may show any information the vendor wish to display to the consumers, which may be programmed or communicated to the displays via the pod computer 106. Display information may also be transmitted from the cloud to the pod computer 106 and then to the shelves. This communication can allow shelves to dynamically update tag description of the items being sold as well as prices. If a vendor wishes to offer a change in price to an item for a one time transaction, or for a one time period, such changes can be made. Such changes can be part of a marketing campaign by the vendor, it can be geographically specific, it can be temporarily specific and any granularity of space and time can be applied for dynamic price to be reflected in the screen of shelves. Such functionality of the shelves may be implemented via communication between the pod computer 106 and the screen display.

At the time an individual consumer requests permission to open a pod door, updates to the display screens at the pod can be made, as well as messages to the mobile phone of the consumer can be sent. Some marketing strategies can be applied from the local computer of the pod, without requiring information coming from the cloud. For example, the vendor can set a policy that the last item in the pod to be offered at a discount. Another example would be to promote a new location, every time someone opens the pod door at such location, a random promotion from a list of predefined promotions, appears to the consumer. Such decisions can be made locally. Other rules that are locally decided can be made. Rules may reside on the pod computer 106 and dynamic pricing to display on the shelves may be executed on display screens.

Moreover, a full automatic system of price updates and promotions can reflect objectives set by the vendor that a machine learning system can learn to update the screens. This can be market strategy for a specific product or set of products for a geographic region where a pod is present or to a group of consumers based on their history, or both, based on geographical place and customer history. The vendor can also define when a rule will be applied and when it will end. The shelf includes hardware and communication support for implementing such marketing strategies. The power supplied to the display system as well as data transmission between the display and the pod computer 106 placed nearby may also provided by the same cable described above.

Voice Recognition: Additionally, the disclosed system may include a voice recognition system. A central computer at a local location to the pod may include a real time AI voice recognition system that it is able to interact with the customer. A customer may be allowed to ask questions, such as "Do you have product A?" "Where is product A?" "Do you have discounts?" Such as feature can allow visually impaired people to locate desired products easily. The system may also allow the central computer and a cloud service to have the precise inventory and distribution of products in each shelf for a voice recognition system to exchange communication with a consumer.

According to one embodiment, the system includes a universal serial bus (e.g., USB 3.1 including any backward compatibility version) connection 504 to provide a communication channel and power supply required by electronic components (e.g., cameras and sensors) connected to a hub of a shelf. A numbering mechanism of each shelf and camera within the system may also be configured. In one embodiment, a numbering mechanism uses a controlled power up sequence in two different levels. A level 1 may control the power up sequence of each shelf, and the shelves may be numbered from top to the bottom. A level 2 numbering sequence may control the power up of each camera on the shelf. The cameras may be numbered in sequence from the left to the right side of each shelf. Each shelf and camera may correspond to a USB device on a central computer and a USB device serial number may be used to map the USB device entry to the number of each shelf or camera. The level 1 powering sequence may be executed by the hub of each shelf and subsequently, the hub may send a command to each shelf to start the level 2 powering sequence.

These commands may be sent using the USB device on the hub for each shelf. In the case of a shelf is restarted after the level 1 was finished, the hub may restart the powering sequence of this specific shelf, to ensure the correct numbering on the system. The hub may placed nearby the pod (cooler or cabinet) and can be in communication with the cloud, if communication is possible. Then, updates to the firmware of shelves can be made remotely. It can also report any failures, to start a maintenance process.

Operating a plurality of pods may require utilization of a number of USB interfaces that exceeds what a native USB controller may be able to handle (given that each pod may employ a plurality of USB devices). The disclosed AI system may be configured in a manner to increase the number of USB devices being managed by the disclosed central hub or computing device. According to one exemplary embodiment, the central hub or computing device may be coupled with a PCIe splitter such that additional USB Controllers may then be connected to each PCIe bus. A power controller may be further coupled to USB hubs to control power to connected devices (e.g., turn on and off the shelves and the cameras). The power controller may also allow resource management during sessions and thus reduce data collection where it may be needed, either in a predefined way or controlled by the AI system running on the central hub or computing device.

Figure 6:
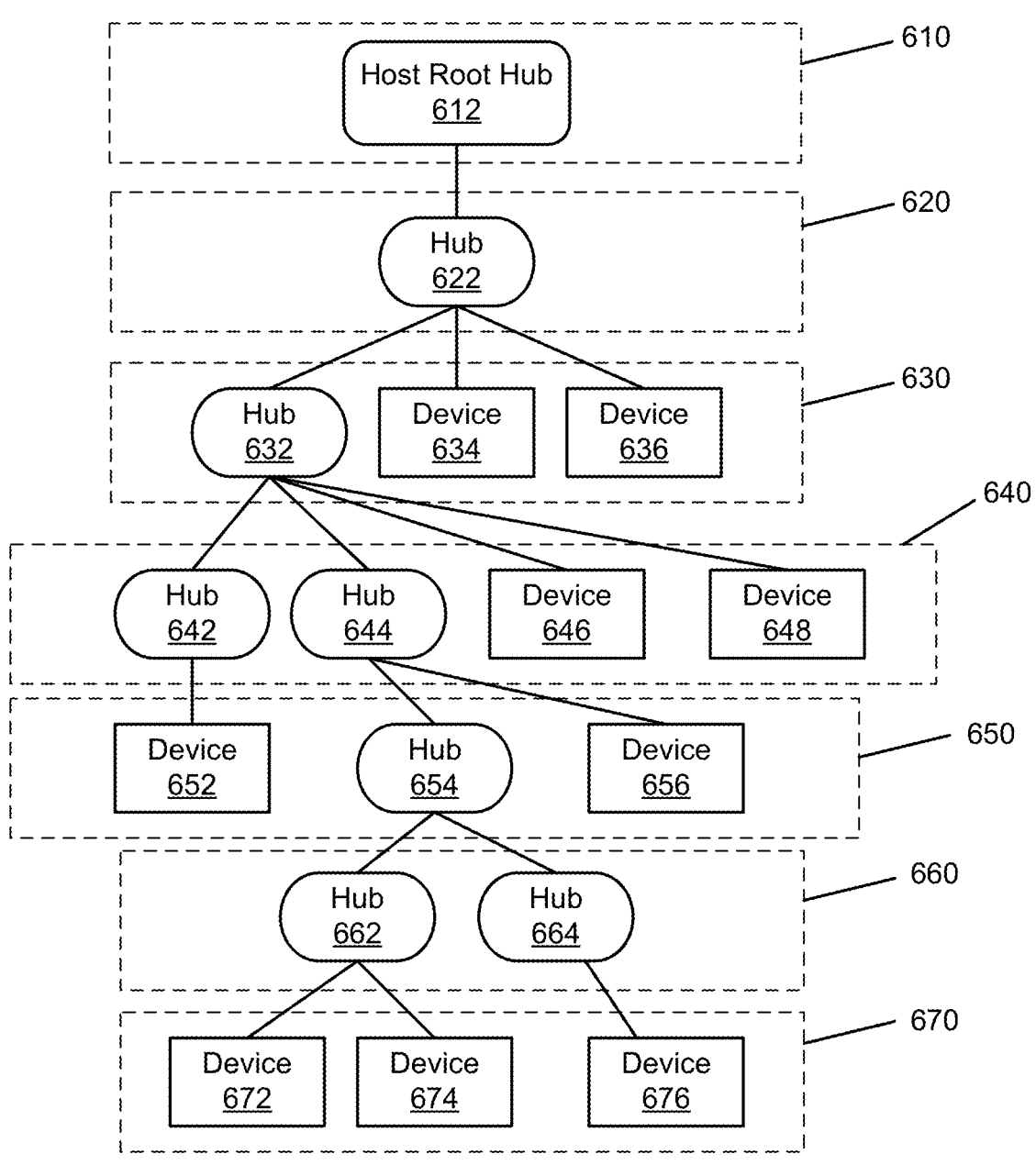
FIG. 6 illustrates a USB hub and controller architecture according to an embodiment of the present invention.

FIG. 6 presents a USB hub and controller architecture according to an embodiment of the present invention. USB hubs and devices may be configured throughout a plurality of tiers 610, 620, 630, 640, 650, 660, and 670 based on an operational system level. Host root hub 610 may comprise a USB controller that is configured on a tier 610 which may represent the central hub or computing device level. Host root hub 610 may provide 12-volt powered USB ports that can be used to connect with hubs such as hub 622 on tier 620. A hub may comprise a device that provides a plurality of USB connections for connecting additional devices to a single USB port.

Tier 620 may represent the pod computer level. Devices 634 and 636 on tier 630 may be connected to hub 622. The devices 634 and 636 may comprise devices, such as static cameras and weight sensors for a given pod tier 630. Hub 632 may be further connected to hub 622 and configured, for example, as a controller of each shelf at tier 640 if different types of shelves require different controllers (Hubs 642 and 644) and additional devices (Devices 646 and 648). The hierarchy of operation can be increased further with additional tiers 650, 660, and 670 via hubs 642, 644, 654, 662, and 664, respectively where devices 652, 656, 672, 674, and 676 may be connected to the hubs. According to another embodiment, one or more of devices 634, 636, 646, 648, 652, 656, 672, 674, and 676 may comprise functionality that connects or links two hubs.

The AI system may retrieve a map of each device (e.g., static camera) from the USB port to its physical location in the environment. The USB enumeration mechanism may be performed automatically by the USB driver. The disclosed architecture may guarantee the enumeration of each static camera as follows:

a) Controlled Power-Up Sequence for the Static Cameras

A microcontroller may be connected on each USB Hub (e.g., on tier 620) and allows the control of power enabling of each static camera to guarantee that each static camera is always detected by the processing unit in the same sequence.

b) Device Mapping Based on USB Topology

At the operational system level, each USB device is renamed to a well know device name, based on the USB device tree path name, as each device will be connected always in the same USB port in the system.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for detecting a commercial transaction through physical interactions with one or more items in a pod, the pod comprising at least one shelf, the at least one shelf comprising a plurality of lanes along a width of the at least one shelf from a left side to a right side of the at least one shelf having items up to height A arranged along a depth D of the at least one shelf from a front of the at least one shelf towards a rear of the at least one shelf, the system comprising:

at least one camera positioned within the pod between two lanes of the plurality of lanes to capture photos of items from the two lanes of the plurality of lanes on the at least one shelf, and wherein the at least one camera and the at least one shelf are inclined with respect to each other an inclination of an angle θ sufficient to allow the at least one camera to see items on or towards the rear of the at least one shelf without being completely occluded by items towards the front of the at least one shelf, the at least one camera and at least one shelf having an adjustment mechanism for adjusting the inclination of the at least one camera and at least one shelf; and a computing device communicatively connected to the at least one camera and at least one shelf, the computing device configured to:

recognize physical interactions with items on the at least one shelf based on data that is received from the at least one camera during a pod use session, the data including one or more image frames taken by the at least one camera;

determine, using artificial intelligence, a commercial transaction representing one or more items removed from or added to the at least one shelf associated with the physical interactions, transmit item and price data based on the determined commercial transaction;

determine an adjusted angle θ of inclination to cover the depth D for items up to the height A in the two lanes while preventing occlusions following removal or addition of the one more items from the at least one shelf; and control the adjustment mechanism to change the inclination of the at least one camera or at least one shelf to the adjusted angle θ.

2. The system of claim 1 wherein the pod includes at least one front camera and/or at least one rear camera.

3. The system of claim 1 wherein the pod includes at least a motor that is configured to move the at least one camera along the width of the at least one shelf.

4. The system of claim 1 wherein the pod further comprises display screens configured to simulate price tags for the items.

5. The system of claim 1 wherein the computing device is further configured to interact with consumers via a real time voice recognition system.

6. The system of claim 1 wherein the at least one camera is configured at a height h above the at least one shelf, the at least one camera including an angle view Φ and being configured according to the angle θ for covering the depth D of items of height up to A to be seen.

7. The system of claim 6 wherein the angle θ includes an angle the at least one camera makes with the at least one shelf to cover a first item at a distance d.

8. The system of claim 7 wherein $$\theta = \frac{\pi}{2} - \frac{\Phi}{2} - \tan^{-1}\frac{d}{h}.$$

9. The system of claim 7 wherein depth $$D = \frac{h - A}{\tan\left(\frac{\pi}{2} - \Phi - \tan^{-1}\frac{d}{h}\right)},$$

the maximum depth that the at least one camera can cover.

10. The system of claim 1 wherein the adjustment mechanism is configured to adjust angle and direction of the at least one camera.

11. The system of claim 1 further comprising a jig including a plurality of mechanisms including a plurality of cameras, the plurality of mechanisms configured to simultaneously adjust angle and direction of the plurality of cameras.

12. The system of claim 11 wherein the jig further comprises a motor mechanism configured to move the at least one camera along a width of the at least one shelf.

13. The system of claim 1 further comprising video cameras coupled to the computing device, the video cameras configured to monitor activities outside of the pod to check items leaving and returning to the pod.

14. The system of claim 1 wherein the pod further comprises display screens, the display screens including information indicating item availability and item characteristics, wherein the information is programmable via the computing device.

15. The system of claim 1 wherein the pod further comprises display screens and wherein the computing device is further configured to transmit promotions from a list of predefined promotions to the display screens.

16. The system of claim 1 wherein the pod further comprises display screens and wherein the computing device is further configured to transmit dynamic pricing to the display screens.

17. The system of claim 1 wherein the pod further comprises display screens and wherein the computing device is further configured to transmit price updates and promotions to the display screens based on machine learning of objectives set by a vendor.

18. The system of claim 1 further comprising a hub executing a power up sequence of the at least one shelf and transmitting a command to the at least one shelf to power up the at least one camera.

19. The system of claim 1 further comprising a tiered USB hub and controller configuration.

20. The system of claim 1, wherein the pod further comprises at least one weight sensor.

* * * * *